United States Patent [19]
Muser

[11] Patent Number: 6,039,396
[45] Date of Patent: *Mar. 21, 2000

[54] BICYCLE SEAT AND SEAT COVER

[75] Inventor: Paul Muser, Oakville, Canada

[73] Assignee: Supima Holdings Inc., Oakville, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/811,659

[22] Filed: Mar. 5, 1997

[51] Int. Cl.[7] ........................................ B62J 1/18
[52] U.S. Cl. ........................................ 297/214; 297/195.1
[58] Field of Search ................. 5/724, 652.1; 297/195.1, 297/214, 215.16, 452.45

[56] References Cited

U.S. PATENT DOCUMENTS

| | | |
|---|---|---|
| 576,192 | 2/1897 | Hoyt . |
| 1,532,400 | 4/1925 | Grafe . |
| 2,051,494 | 8/1936 | Mitchell et al. . |
| 3,484,319 | 12/1969 | Takenaka . |
| 3,514,156 | 5/1970 | Fields . |
| 3,885,259 | 5/1975 | Cheong . |
| 4,012,072 | 3/1977 | Hansen . |
| 4,429,915 | 2/1984 | Flager ................................ 297/214 X |
| 5,203,607 | 4/1993 | Landi ...................................... 297/214 |
| 5,252,373 | 10/1993 | Ganske et al. ....................... 297/214 X |
| 5,333,930 | 8/1994 | Glenn . |
| 5,348,369 | 9/1994 | Yu ..................................... 297/195.1 X |
| 5,397,161 | 3/1995 | Huang ................................. 297/195.1 |
| 5,408,711 | 4/1995 | McClelland ............................ 5/724 X |
| 5,489,139 | 2/1996 | McFarland ........................... 297/195.1 |
| 5,558,396 | 9/1996 | Yu ..................................... 297/195.1 X |

*Primary Examiner*—Peter M. Cuomo
*Assistant Examiner*—Stephen Vu
*Attorney, Agent, or Firm*—Ingrid E. Schmidt

[57] ABSTRACT

A seat covering is made with a planar base of resilient material and a plurality of resilient spaced columns integrally formed with the base. Each column has a wide end adjacent to the base and a free narrow end remote from the base, the columns extending outwardly on one side of the base to define a shock absorbing surface spaced from the base and creating a flow path for ambient air to travel between the columns. The columns are adapted to flex independently from one another and to converge together or diverge from one another in response to the movement or anatomy of a person, so that friction resulting from relative movement between the covering and the person is minimized.

3 Claims, 3 Drawing Sheets

BICYCLE SEAT AND SEAT COVER

FIELD OF THE INVENTION

This invention relates to a covering for a bicycle seat and, more particularly, to an improved upholstery which could find application elsewhere.

BACKGROUND OF THE INVENTION

A great number of seats have been developed, particularly for cyclists, which are intended to improve the comfort of the rider. Much attention has been devoted to improving the cushioning or resiliency of the seat by providing an improved suspension associated with the seat or a more forgiving padding in the seat itself.

To a large extent, a cyclist's discomfort arises because the cyclist is not static and the buttocks are constantly moving relative to the seat. This problem is partly addressed in prior art devices where the seat is made in two portions which are independently movable, each portion being adapted to alternately support one of the buttocks. An example of such a structure is shown in U.S. Pat. No. 4,387,925. Such seats are nevertheless unsatisfactory unless they can be customized to an exact shape which conforms to the rider's anatomy.

Other attempts to improve the comfort of the rider have concentrated on the seat's surface, as in U.S. Pat. No. 5,333,930, where the seat is covered by a multitude of incompressible beads intended to enhance blood circulation to the crotch and buttock regions and to allow continuous air circulation therebetween.

The seat, in accordance with this invention, is intended for use with a mounting arrangement whereby the relative position of the seat to the cycle frame changes during pedalling so that the seat effectively has a dynamic changing shape which varies in accordance with the position of the rider and whether the rider's legs are in a downward pedalling stroke or an upward pedalling stroke. The unique shape of the seat does not itself form part of this invention and is more fully described in Applicant's co-pending application entitled "Mounting Structure for Cycle Seat" of which the disclosure is herein incorporated by reference.

The object of this invention is to provide an improved upholstery which will maximize the user's comfort, whether seated on a cycle or a chair.

SUMMARY OF THE INVENTION

In accordance with this invention, there is provided a seat covering having a planar base made of resilient material and a plurality of resilient spaced columns integrally formed with said base, each column having a wide end adjacent to the base and a free narrow end remote from the base, the columns extending outwardly on one side of the base to define a shock absorbing surface spaced from said base and creating a flow path for ambient air to travel between the columns, the columns being adapted to flex independently from one another and to converge together or diverge from one another in response to the movement or anatomy of a person, so that friction resulting from relative movement between the covering and the person is minimized.

The invention further provides for the covering to be associated with resilient cushioning means in the form of a bladder or a self-inflating open cell foam pad, disposed beneath the covering and for a sheath disposed over the covering to maximize the rider's comfort.

BRIEF DESCRIPTION OF THE DRAWINGS

A preferred embodiment of the invention is described below with reference to the accompanying drawings, in which.

DESCRIPTION OF PREFERRED EMBODIMENT

Figure 1:
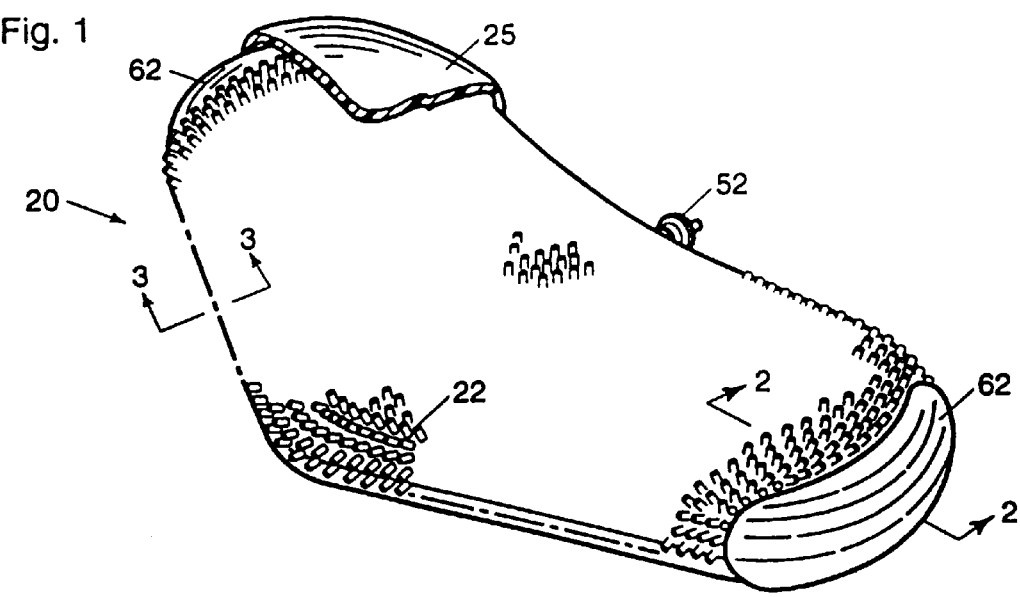
FIG. 1 is a perspective view from the top and to one side showing a seat covering associated with a bicycle seat and made in accordance with this invention.
Figure 2:
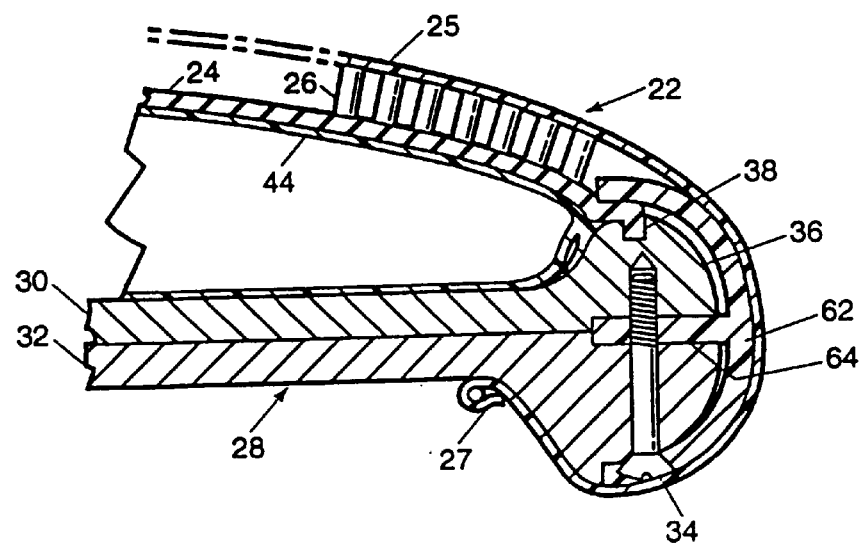
FIG. 2 is a cross-sectional view of the seat taken on line 2—2 of FIG. 1.

The seat, in accordance with the invention, is generally indicated by reference numeral 20 and has a unique deltoid shape characterized by two rearwardly extending, rounded, wing-like portions or lobes which extend transversely on opposite sides of a median line traversing a gently rounded front disposed between the wing-like portions. The result is a seat with an aerodynamic shape which generally resembles a boomerang. The seat is also characterized by curved and rounded portions which, unlike prior art seats, does not have any narrow protruding portions such as a "horn" which could penetrate and harm a rider.

The covering 22 for the seat is comprised of a base sheet 24 made of resilient material such as rubber or polyvinyl-chloride or urethane blends. A plurality of integrally formed columns 26 extend outwardly on one side of the sheet 24 and have pre-determined heights which are selected so that the ends of the columns 26 will come into abutment with the rider. It will be appreciated that, if the columns are too long, contact with the rider will be made along the length of the columns which is not desirable. On the other hand, the columns 26 must be sufficiently long to flex with the movement of a rider. A length of approximately 9 mm. and a diameter of 4 mm. are preferred. It will be noted that the columns are tapered so that they have a wide end adjacent to the base sheet 24 and a free narrow end remote from the base sheet 24. The spacing and distribution of the columns relative to each other may also vary. Preferably, the columns will be formed in rows in which adjacent rows will be staggered relative to each other and the rows may be spaced closer together for additional support in some areas.

It is also foreseeable that selected columns may differ from others in shape, size, or by some other means, to form a design or to convey a promotional message visible to a viewer remote from the seat. In selected areas, the columns may extend above the base sheet 24 for very short distances, and some areas of the covering may have no columns at all. The ends of the columns may optionally be radiused to improve the rider's comfort.

An optional sheath 25 made of Nylon™ or Dacron™ may be provided to cover the seat 20. The sheath material may be selected to be thin enough to minimize interference with the movement of the underlying columns while nevertheless distributing the rider's weight to maximize comfort. In most applications, it is expected that a sheath 25 would operate by holding the outer ends of the columns so that most of the displacement would take place in the body of the columns and thereby minimize the likelihood of the rider getting pinched between converging columns. Conveniently, the sheath is attached by a drawstring 27 held in a hem formed in the sheath and the sheath 25 may therefore be removed and replaced, as necessary. It is envisaged that the sheath 25 may be provided in decorative fabrics which could also have promotional messages applied to them.

The covering 22 is mounted to a base 28 comprising a shaped upper plate 30 and a congruent lower plate 32, the upper plate and lower plate being secured together at their periphery 20 with screws 34. As drawn, the upper and lower plates 30 and 32 are made from metal which may be a suitable aluminum or titanium alloy and could alternatively be molded from a synthetic plastic material.

Figure 3:
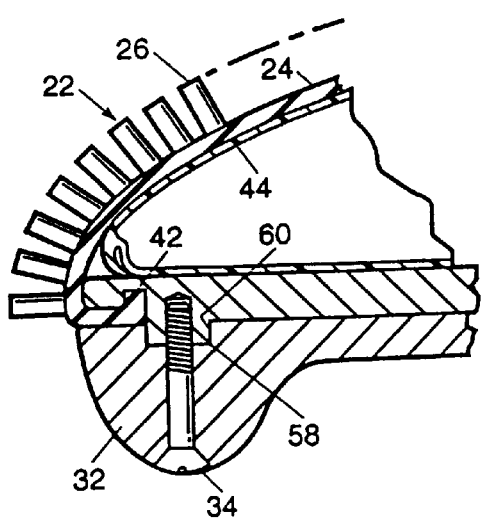
FIG. 3 is a cross-sectional view of the seat taken on line 3—3 of FIG. 1.
Figure 4:
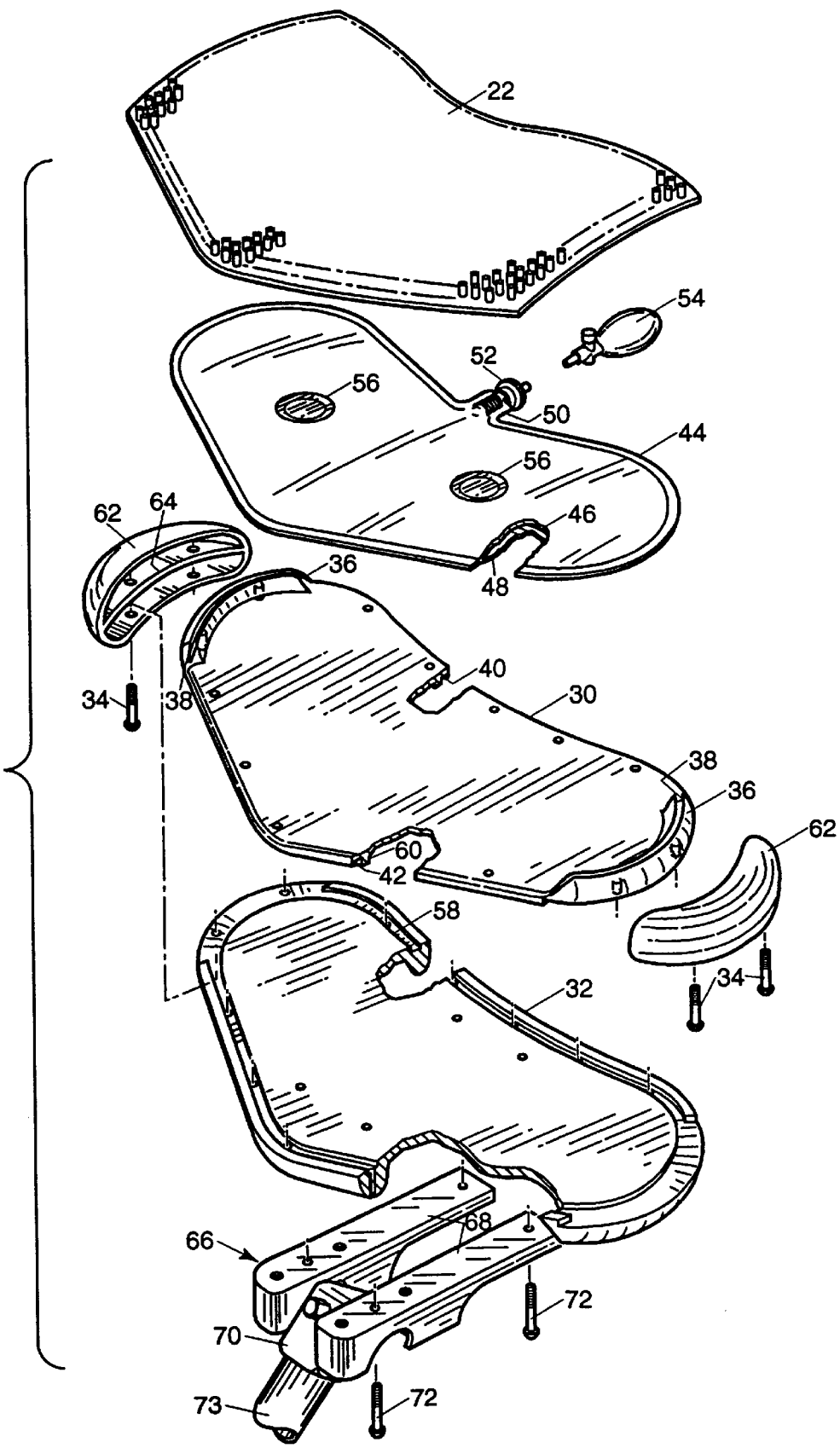
FIG. 4 is a perspective exploded view showing the assembly of the component parts of the seat of FIG. 1.

A pair of upwardly extending ridges 36 are formed in the upper plate 30 at opposite ends thereof and the ridges 36 each have a groove 38 which locates and retains the sides of the covering 22. A back groove 40 is formed on the under-surface of the upper plate 30 to receive the back edge of the covering 22 while a front groove 42 likewise formed on the bottom surface of the upper plate receives the front edge of the covering 22 as shown in FIGS. 3 and 4.

The top surface of the upper plate 30 defines a smooth surface which supports cushioning means preferably in the form of an inflatable bladder 44 disposed between the covering 22 and the base 28. The bladder 44 comprises two sheets 46, 48 of impermeable material such as vinyl or rubber sealed to each other at their periphery and having a common opening 50 which receives a valve 52 through which air may be introduced or released, using a bulb attachment 54 or equivalent means. A pair of hollows or holes 56 formed in the body of the bladder 44 are positioned so as to lie generally in correspondence with the ends of the pelvic bones (tuberosities of the ischia) of a rider using the seat.

The bottom plate 32 has a peripheral groove 58 formed in the upper surface which locates and receives a peripheral ridge 60 formed in the bottom surface of the upper plate 30. As can be seen in FIG. 3, the fasteners 34 which secure the upper and lower plates comprising the base 28 are received in the groove 58 and penetrate the ridge 60. The peripheral groove 58 and ridge 60 are interrupted at the ends of the seat 20 so as to accommodate a pair of end caps 62 which locate over the covering 22 and the base 28 and have a bifurcating midplate 64 that locates between the upper and lower plates in the area where the peripheral groove 58 and peripheral ridge 60 have been interrupted.

The seat 20 may be mounted to a cycle by various means. In the embodiment illustrated, a mounting bracket 66 comprising a pair of rails 68 and a rotary bearing 70 disposed between the rails is secured to the underside of the lower plate 32 with threaded fasteners 72. Conveniently, the rotary bearing 70 is disposed at one end of a seat post 73 which forms part of the cycle frame and is attached in conventional fashion. This aspect of the Applicant's invention is more fully described in Applicant's co-pending application entitled "Mounting Structure for Cycle Seat" of which the disclosure is herein incorporated by reference.

Figure 5:
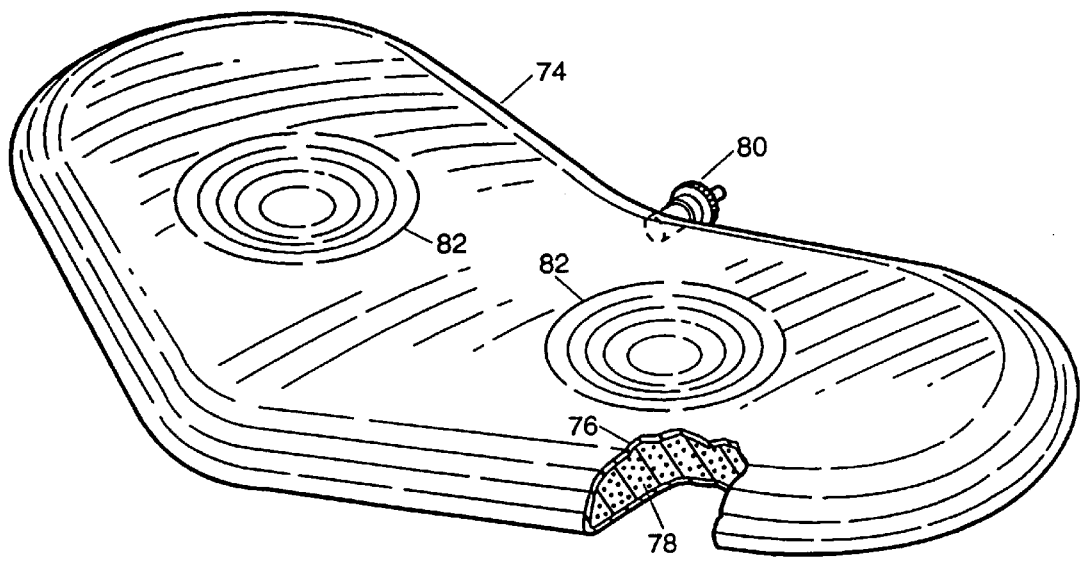
FIG. 5 is a perspective view of a self-inflating pad which may optionally be used in the seat of FIG. 1 to replace a bladder.

In a variation of the invention, the bladder 44 is substituted by a self-inflating open cell pad 74, drawn in FIG. 5. The pad 74 comprises an outer impermeable shell 76 and an inner open cell core 78 which is in open communication with a valve 80 provided to control the flow of air into the core. As in the case of the bladder 44, the pad is shaped with a pair of spaced depressions or holes 82 in the areas which correspond generally to where pressure will be applied by the tuberosities of the ischia.

In use, it will be understood that the covering 22, through its columns 26, provides a shock-absorbing surface which will also massage the rider while the rider pedals or moves. Because of their flexibility, the columns may, independently or in concert with neighbouring columns, respond to any change in the rider's position or shape so that, while some columns will support a greater load, others will be released. The surface of the seat is thus constantly changing to accommodate the rider and will define a forgiving surface that may conceal foreign objects, such as keys or coins in the rider's pockets.

The covering 22 is waterproof and therefore eliminates problems arising in conventional coverings from the passage and entrapment of undesirable contaminants and moisture and which create a fertile breeding ground for fungus and bacteria that may lead to yeast infections and other unfortunate medical consequences.

It will also be understood that the columnar configuration of the covering 22 creates a flow path for air to travel between the rider and the seat thereby helping to keep the rider dry and to minimize the occurrence of a heat rash which might otherwise occur, because air is allowed to flow and escape freely around and within free spaces defined between the columns. Moreover, the rider, returning to an exposed seat after a rainstorm, can simply wipe a hand over the raised flexible columns and flick away any water off of the top of the columns, mount the seat and ride away virtually dry.

Finally, it will be appreciated that the columns will, owing to their flexibility, maintain contact with the rider and therefore the occurrence of chafing arising from relative motion between the rider and the seat is minimized to a great extent. Contact with the rider's body is further maximized by the resilient cushioning means disposed underneath the covering, either in the form of a bladder or foam pad or equivalent structure.

In the embodiments described, the rider has the opportunity to release small amounts of air while sitting and riding, so as to adjust the seat to a desired comfort level in accordance with the preference of the individual occupying the seat. Alternatively, a padding or cushion of predetermined softness may be used in association with the seat covering according to the invention. The depressions in the padding further improve the rider's comfort by reducing the likelihood of any pain arising from pressure to the pelvic bones when the rider is seated. The seat is thus designed to accommodate individuals of all sizes, shapes, genders and weights so that they may sit comfortably for long periods of time without discomfort or pain.

It will also be appreciated that the planar surface of the base for the seat can very easily be wiped clean with a cloth or rinsed with a garden hose, thereby further minimizing the opportunity to trap dirt, insects and the like.

It will be understood that several variations may be made to the above-described embodiment of the invention without departing from the spirit thereof. In particular, it will be understood that the columns may protrude through a perforated template located above the sheet 24 or may be bonded to a rigid or semi-rigid base, if a more rigid seat structure is desired. It will also be appreciated that the shape of the seat, its construction, and the manner of attaching the covering to the seat may vary considerably, the above-embodiment having been described for illustration purposes only.

The invention will also find application in a covering for other items of furniture, including, without limitation, cushions, mattresses, arm rests, and pads—wherever upholstery is used. It will, of course, be understood that the covering may be used to cover only selected portions of the furniture items to which it is applied.

I claim:

1. A seat having a supporting base and a covering, the covering having a planar base sheet made of resilient material disposed over the supporting base and a plurality of resilient spaced columns integrally formed with said base sheet, each of the columns having a wide end adjacent to the base sheet and a free narrow end remote from the base sheet, each of the columns extending outwardly on one side of the base sheet away from said supporting base, said columns being adapted to create a flow path for ambient air to flow around and within free spaces defined between the columns, and to flex independently from one another and to converge together or diverge from one another in response to the movement or anatomy of a person, so that friction resulting from relative movement between the covering and a person is minimized.

2. A seat having a supporting base and a covering, the covering having a planar base sheet made of resilient material disposed over the supporting base and a plurality of resilient spaced columns integrally formed with said base sheet, each of the columns having a wide end adjacent to the base sheet and a free narrow end remote from the base sheet, each of the columns extending outwardly on one side of the base sheet away from said supporting base, said columns being adapted to create a flow path for ambient air to flow around and within free spaces defined between the columns, and to flex independently from one another and to converge together or diverge from one another in response to the movement or anatomy of a person, so that friction resulting from relative movement between the covering and a person is minimized; and cushioning means disposed between the base sheet and the supporting base to improve comfort.

3. A seat having a supporting base and a covering, the covering having a planar base sheet made of resilient material disposed over the supporting base and a plurality of resilient spaced columns integrally formed with said base sheet, each of the columns having a wide end adjacent to the base sheet and a free narrow end remote from the base sheet, each of the columns extending outwardly on one side of the base sheet away from said supporting base, said columns being adapted to create a flow path for ambient air to flow around and within free spaces defined between the columns, and to flex independently from one another and to converge together or diverge from one another in response to the movement or anatomy of a person, so that friction resulting from relative movement between the covering and a person is minimized;

cushioning means disposed between the base sheet and the supporting base to improve comfort; and a removable sheath disposed over the free narrow ends of the resilient columns.

* * * * *